(12) United States Patent
Donolo et al.

(10) Patent No.: US 12,695,296 B2
(45) Date of Patent: Jul. 28, 2026

(54) HIGH-IMPEDANCE BUS DIFFERENTIAL PROTECTION

(71) Applicant: Schweitzer Engineering Laboratories, Inc., Pullman, WA (US)

(72) Inventors: Marcos A. Donolo, Pullman, WA (US); Anushka M. Dissanayake, Pullman, WA (US); Pallavi Kulkarni, Pullman, WA (US); Jay Hartshorn, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 188 days.

(21) Appl. No.: 18/538,148

(22) Filed: Dec. 13, 2023

(65) Prior Publication Data

US 2024/0204513 A1      Jun. 20, 2024

Related U.S. Application Data

(60) Provisional application No. 63/387,898, filed on Dec. 16, 2022.

(51) Int. Cl.
  *H02H 9/04* (2006.01)
  *H02H 3/20* (2006.01)
(52) U.S. Cl.
  CPC ............ *H02H 9/042* (2013.01); *H02H 3/202* (2013.01); *H02H 9/041* (2013.01)
(58) Field of Classification Search
  CPC ............ H02H 9/04; H02H 3/20; H02H 9/042; H02H 3/202; H02H 9/041; H02H 9/043; H02H 1/0007

USPC ........................................................ 361/2–13
See application file for complete search history.

(56) References Cited

U.S. PATENT DOCUMENTS

| | | | |
|---|---|---|---|
| 4,387,336 A | 6/1983 | Joy | |
| 4,829,298 A | 5/1989 | Fernandes | |
| 5,006,846 A | 4/1991 | Granville | |
| 5,224,011 A | 6/1993 | Yalla | |
| 5,341,265 A | 8/1994 | Westrom | |
| 5,392,184 A * | 2/1995 | Unterlass | H02J 3/1807 361/15 |
| 5,446,682 A | 8/1995 | Janke | |
| 5,498,956 A | 3/1996 | Kinney | |
| 5,592,393 A | 1/1997 | Yalla | |
| 5,694,281 A | 12/1997 | Roberts | |
| 5,703,745 A | 12/1997 | Roberts | |

(Continued)

OTHER PUBLICATIONS

John Needs and Zafer Korkmaz "Using the SEL-751 and SEL-751A for High-Impedance Differential Protection" SEL Application Guide, vol. IV, Mar. 2017.

(Continued)

*Primary Examiner* — Danny Nguyen
(74) *Attorney, Agent, or Firm* — Jared L. Cherry; Richard M. Edge

(57) ABSTRACT

A system for high impedance bus protection that includes a safety module to divert excess current away from a protective element of an intelligent electronic device. The safety module may include a variable resistor and a bypass relay in parallel across secondaries of one or more current transformers. The bypass relay may be configured to close upon detection of excess current through the secondaries to divert the excess current away from the variable resistor and the protective element.

18 Claims, 8 Drawing Sheets

(56)            References Cited

U.S. PATENT DOCUMENTS

| | | | | |
|---|---|---|---|---|
| 5,731,943 | A | 3/1998 | Roberts | |
| 5,751,530 | A * | 5/1998 | Pelly | H02H 3/00 |
| | | | | 361/42 |
| 5,793,750 | A | 8/1998 | Schweitzer | |
| 5,963,404 | A | 10/1999 | Guzman | |
| 6,028,754 | A | 2/2000 | Guzman | |
| 6,236,949 | B1 | 5/2001 | Hart | |
| 6,256,592 | B1 | 7/2001 | Roberts | |
| 6,265,881 | B1 | 7/2001 | Meliopoulos | |
| 6,341,055 | B1 | 1/2002 | Guzman | |
| 6,356,421 | B1 | 3/2002 | Guzman | |
| 6,411,865 | B1 | 6/2002 | Qin | |
| 6,442,010 | B1 | 8/2002 | Kasztenny | |
| 6,446,682 | B1 | 9/2002 | Viken | |
| 6,518,767 | B1 | 2/2003 | Roberts | |
| 6,525,543 | B1 | 2/2003 | Roberts | |
| 6,590,397 | B2 | 7/2003 | Roberts | |
| 6,603,298 | B2 | 8/2003 | Guzman | |
| 6,608,742 | B2 | 8/2003 | Schweitzer | |
| 6,662,124 | B2 | 12/2003 | Schweitzer | |
| 6,757,146 | B2 | 6/2004 | Benmouyal | |
| 6,839,210 | B2 | 1/2005 | Roberts | |
| 6,845,333 | B2 | 1/2005 | Anderson | |
| 6,946,753 | B2 | 9/2005 | Kernahan | |
| 7,002,784 | B2 | 2/2006 | Wang | |
| 7,196,884 | B2 | 3/2007 | Guzman | |
| 7,209,839 | B2 | 4/2007 | Roytelman | |
| 7,319,576 | B2 | 1/2008 | Thompson | |
| 7,480,580 | B2 | 1/2009 | Zweigle | |
| 7,570,469 | B2 | 8/2009 | Guzman | |
| 7,582,986 | B2 | 9/2009 | Folkers | |
| 7,630,863 | B2 | 12/2009 | Zweigle | |
| 7,660,088 | B2 | 2/2010 | Benmouyal | |
| 7,710,693 | B2 | 5/2010 | Guzman | |
| 7,856,327 | B2 | 12/2010 | Schweitzer | |
| 8,405,944 | B2 | 3/2013 | Donolo | |
| 2004/0027748 | A1 | 2/2004 | Kojovic | |
| 2004/0059469 | A1 | 3/2004 | Hart | |
| 2006/0224336 | A1 | 10/2006 | Petras | |
| 2007/0086134 | A1 | 4/2007 | Zweigle | |
| 2008/0281540 | A1 | 11/2008 | Zweigle | |
| 2009/0085407 | A1 | 4/2009 | Venkatasubramanian | |
| 2009/0088989 | A1 | 4/2009 | Guzman | |
| 2009/0088990 | A1 | 4/2009 | Schweitzer | |
| 2009/0089608 | A1 | 4/2009 | Guzman | |
| 2009/0091867 | A1 | 4/2009 | Guzman | |
| 2009/0099798 | A1 | 4/2009 | Gong | |
| 2009/0125158 | A1 | 5/2009 | Schweitzer | |
| 2010/0002348 | A1 | 1/2010 | Donolo | |
| 2010/0053830 | A1 * | 3/2010 | Andersson | H02H 3/023 |
| | | | | 361/91.1 |
| 2010/0114390 | A1 | 5/2010 | Stevenson | |
| 2015/0029621 | A1 * | 1/2015 | Giannoccaro | H02H 9/04 |
| | | | | 361/54 |
| 2015/0055260 | A1 * | 2/2015 | Tekletsadik | H02H 9/005 |
| | | | | 361/87 |
| 2021/0288490 | A1 * | 9/2021 | Beck | H02H 9/02 |
| 2022/0085600 | A1 * | 3/2022 | Qi | H02H 3/08 |
| 2023/0056704 | A1 * | 2/2023 | Urai | H02M 1/325 |
| 2024/0079878 | A1 * | 3/2024 | Pan | H02J 13/0004 |
| 2025/0062609 | A1 * | 2/2025 | Grimm | H02H 3/025 |

OTHER PUBLICATIONS

Ariana Hargrave, Michael J. Thompson, and Brad Heilman, "Beyond the Knee Point: A Practical Guide to CT Saturation" Originally presented at the 44th Annual Western Protective Relay Conference, Oct. 2017.

Stanley E. Zocholl and David Costello, "Application Guidelines for Microprocessor-Based, High-Impedance Bus Differential Relays," Originally presented at the 62nd Annual Conference for Protective Relay Engineers, Mar. 2009.

Russ Franklin, Michael J. Thompson and Hector J. Altuve "High-Impedance Differential Applications with Mismatches CTs" Originally presented at the 44th Annual Wester Protective Relay Conference, Oct. 2017.

* cited by examiner

Fault Current (Amps)

Current Measured By ANSI Element 50 (Amps)

Voltage Measured By ANSI Element 59 (Volts)

Time

300

320

Secondary of
Parallel CTs

308

59

310

50

304

306

Fault
Current
(Amps)

1500
1000
500
0
-500
-1000
-1500

312

320

Current
Measured
By ANSI
Element
50
(Amps)

20
10
0
-10
-20

314

Voltage
Measured
By ANSI
Element
59
(Volts)

600
400
200
0
-200
-400
-600

316

318

400

Secondary of
Paralleled
CTs

500

Secondary of
Paralleled
CTs

HIGH-IMPEDANCE BUS DIFFERENTIAL PROTECTION

RELATED APPLICATIONS

This application claims priority to U.S. Provisional Application Ser. No. 63/387,898, filed on Dec. 16, 2022, entitled "HIGH-IMPEDANCE BUS DIFFERENTIAL PROTEC-TION," which is hereby incorporated by reference in its entirety for all purposes.

TECHNICAL FIELD

This disclosure relates to high-impedance bus differential protection in an electric power system.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Further-more, the described features, structures, or characteristics may be combined in any suitable manner in one or more alternative embodiments.

DETAILED DESCRIPTION

Reliable and secure electric power delivery system protection is facilitated by acquisition of current signals that reliably represent current of monitored equipment. For example, a high-impedance bus differential application typically includes a number of current transformers (CTs), each in electrical communication with a feeder of a bus, where a CT secondary (or secondaries) are connected in parallel. An intelligent electronic device (IED) may have an input for the CT secondary (or secondaries), and include hardware for safely obtaining current signals from the CT secondary (or secondaries). For example, hardware may be included to reduce and/or divert current on the CT secondary (or secondaries) due to fault conditions. The embodiments described herein provide increased robustness of CT secondary safety hardware of an intelligent electronic device (IED).

Figure 1:
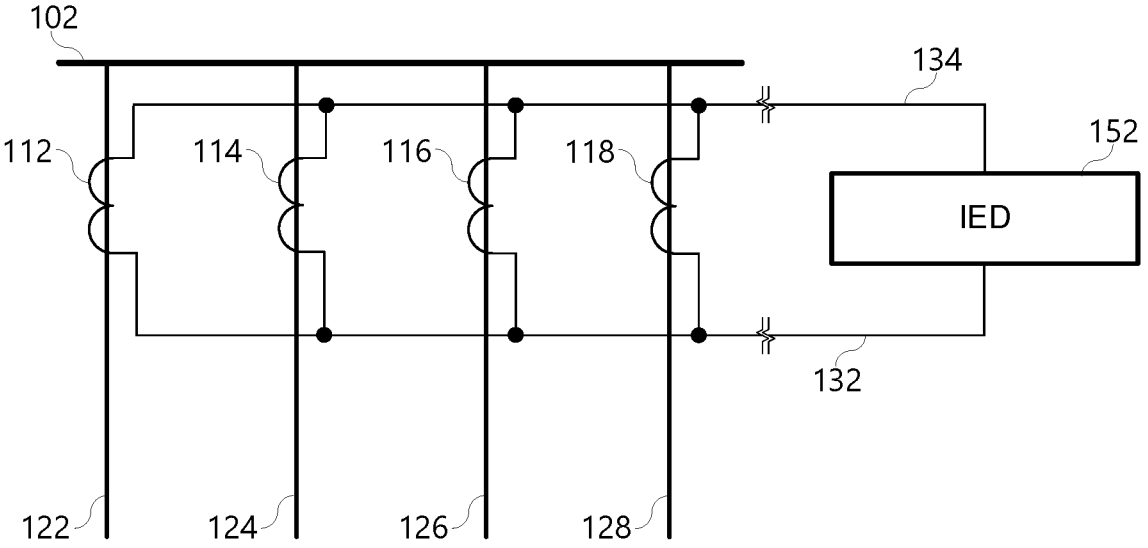
FIG. 1 illustrates a simplified one-line diagram of a portion of an electric power delivery system and associated protection system using instrument transformers consistent with embodiments of the present disclosure.

FIG. 1 illustrates a simplified one-line diagram of a portion of an electric power delivery system that includes a bus 102 and a plurality of feeders 122, 124, 126, 128 consistent with embodiments of the present disclosure. Each feeder 122-128 includes a CT (112, 114, 116, 118, respectively) for providing current signals to an IED 152. As can be seen, secondary terminal leads 132, 134 from corresponding sides of each CT 112-118 may be joined together for providing a differential current signal to the IED 152.

IED 152 may be configured to provide bus differential protection. Bus differential protection may include an overvoltage element (ANSI Standard Device Number 59), an overcurrent protective element (ANSI Standard Device Number 50), or the like. IED 152 may also include hardware for safely obtaining signals from the CT secondary.

Figures 2A, 2B:
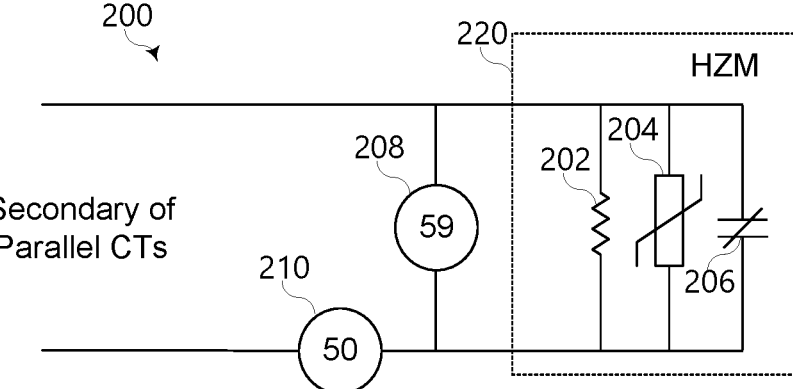
FIG. 2A illustrates a simplified block diagram of a high-impedance protection module comprising a stabilizing resistor.
FIG. 2B illustrates a plot over time of the response of the system in FIG. 2A to a fault.

FIG. 2A illustrates a high impedance differential protection circuit 200 comprising a high impedance module 220 that includes a stabilizing resistor 202, varistor (a.k.a. voltage-dependent resistor) 204, and a bypass relay 206. Stabilizing resistor 202 forces CT saturation for internal faults and large voltage to be developed, which are in turn detectable by an overvoltage element 208 disposed in parallel to stabilizing resistor 202. Varistor 204 is also connected in parallel with stabilizing resistor 202. Varistor 204 exhibits an electrical resistance that varies with the applied voltage. At low voltage, varistor 204 has a high electrical resistance, but the resistance decreases as the voltage is raised. Accordingly, varistor 204 establishes an upper limit on the voltage of high impedance differential protection circuit 200. Excessive voltage may create a dangerous condition, may damage insulation, and/or may damage high impedance differential protection circuit 200. A bypass relay 206 may also be connected in parallel with the stabilizing resistor 202. Bypass relay 206 may transition between an open state and a closed state based on signal. A signal to close bypass relay 206 may be generated after an internal fault is detected and diverts current away from varistor 204 and stabilizing resistor 202. Channeling the fault current through bypass relay 206 may limit the temperature rise in stabilizing resistor 202 and varistor 204.

If stabilizing resistor 202 fails in a shorted state (i.e., the resistance is 0Ω or close to 0Ω), overvoltage element 208 will not function as necessary to detect fault conditions. This concern is particularly acute for surface mounted components. To minimize this problem the total value of the stabilizing resistor 202 may be spread over several resistors connected in series and parallel; however, using several resistors can be costly, both in parts and printed circuit board (PCB) space.

FIG. 2B illustrates a plot over time of a fault current 212, a current 214 measured by overcurrent element 210, and a voltage 216 measured by overvoltage element 208 consistent with embodiments of the present disclosure. As the fault current 212 develops, the voltage measured by overvoltage element 208 spikes. As the fault current 212 continues to flow, the current flow through overcurrent element 210 increases. After a suitable amount of time has passed for overvoltage element 208 to detect the fault, bypass relay 206 may close at time 218. Closing bypass relay 206 provides a low-resistance path for the fault current, and thus the voltage measured by overvoltage element 208 drops. Overvoltage element 208 and overcurrent element 210 may interrupt the flow of electrical current through high impedance differential protection circuit 200 at time 220.

Figures 3A, 3B:
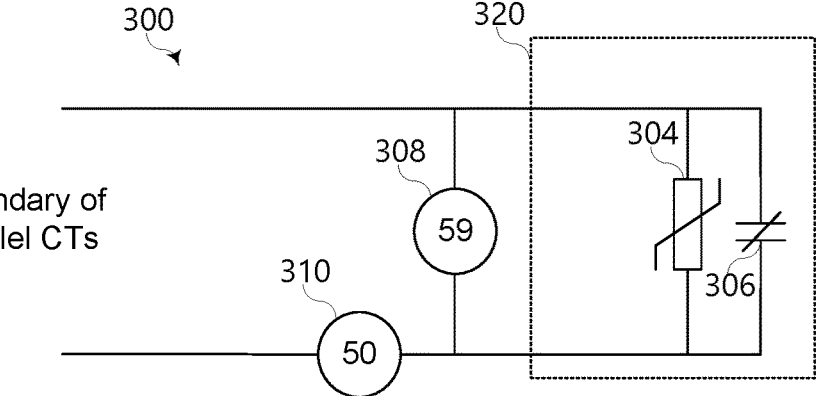
FIG. 3A illustrates a simplified block diagram of a high-impedance protection module consistent with embodiments of the present disclosure.
FIG. 3B illustrates a plot over time of the response of the system in FIG. 3A to a fault consistent with embodiments of the present disclosure.

FIG. 3A illustrates a high impedance differential protection circuit 300 comprising a high impedance module 320 that includes a varistor 304 and a bypass relay 306 consistent with embodiments of the present disclosure. As will be appreciated by comparing FIG. 2A and FIG. 3A, high impedance differential protection circuit 300 does not include a resistor disposed in parallel with varistor 304 and bypass relay 306. Instead, varistor 304 may provide substantially all of the electrical impedance to develop voltage across overvoltage element 308. Varistor 304 may be embodied as a metal oxide varistor ("MOV") in various embodiments consistent with the present disclosure.

FIG. 3B illustrates a plot over time of a fault current 312, a current 314 measured by overcurrent element 310, and a voltage 316 measured by overvoltage element 308 consistent with embodiments of the present disclosure. As the fault current increases, current 314 and voltage 316 also increase. The increases in current 314 and voltage 316 may be detected by overcurrent element 310 and overvoltage element 308, respectively. After a suitable amount of time has passed for overvoltage element 308 and/or overcurrent element 310 to detect the fault and initiate a control action to interrupt the flow of electrical current to high impedance differential protection circuit 300, bypass relay 306 may close and provide a low-resistance path through high impedance differential protection circuit 300, thus dissipating voltage 316 at time 318. The flow of current through high impedance differential protection circuit 300 may be terminated at time when a trip signal is generated by overvoltage element 308 and/or overcurrent element 310 is implemented.

High impedance differential protection circuit 300 avoids the potential for a stabilizing resistor to fail by omitting the stabilizing resistor. As can be seen by comparing FIG. 2A and FIG. 2B, the response of high impedance differential protection circuit 300 is similar to the response of high impedance differential protection circuit 200. As such, high impedance differential protection circuit 300 achieves additional benefits, such as avoiding the cost of the stabilizing resistors and reducing the space needed for a PCB in a high-impedance differential protection circuit.

Modeling the behavior of the system for internal faults with low fault currents may be more complex because the resistance of varistor 304 changes from a very high value (while the voltage is low) to a low value (e.g., ≈25Ω) once the voltage reaches its cutoff. While the exact behavior is hard to model, the resistance of high impedance differential protection circuit 300 will exceed the resistance of high impedance differential protection circuit 200. The voltage will consequently be higher, but the voltage is limited by varistor 304.

Figure 4:
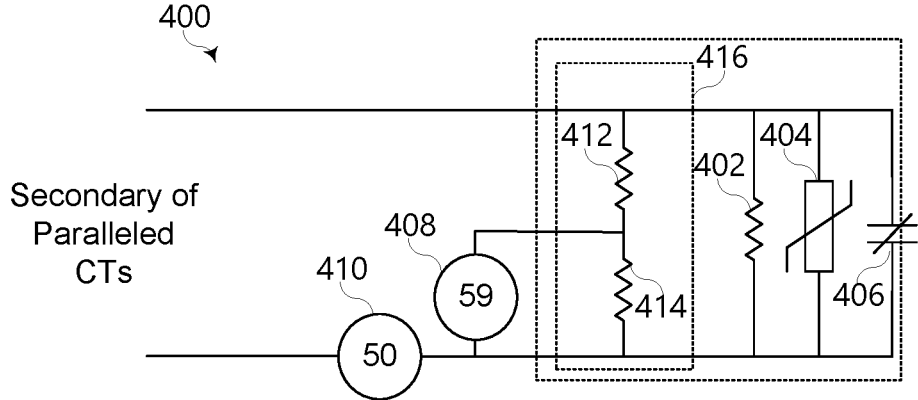
FIG. 4 illustrates a simplified block diagram of a high-impedance protection module comprising a voltage divider consistent with embodiments of the present disclosure.

FIG. 4 illustrates a high-impedance differential protection circuit 400 comprising a voltage divider 416 consistent with embodiments of the present disclosure. As may be appreciated by comparing high-impedance differential protection circuit 400 to high impedance differential protection circuit 200 illustrated in FIG. 2, an overvoltage element 408 is connected across a resistor 414 that, along with resistor 412, creates voltage divider 416. Resistor 412 and resistor 414 may have high impedance values (e.g., two orders of magnitude greater than stabilizing resistor 402). In some embodiments, the combined impedance of resistor 412 and resistor 414 may be approximately 1 MΩ. The high resistance of resistor 412 and resistor 414 does not substantially impact the protection provided by high-impedance differential protection circuit 400 because the high resistance values of resistor 412 and resistor 414 result in little power consumption and thus, little heating.

As discussed above, a bypass relay 406 may close after overvoltage element 408 and/or overcurrent element 410 detects a fault. Bypass relay 406 is closed to avoid overloading the varistor and (if present) the stabilizing resistor 402. Then the secondary fault current flows through the bypass relay 406 limited only by the internal impedances of the CTs and leads. A properly sized bypass will withstand this current with no problem, but it will cost more than smaller, less capable bypass relays. A failure of resistor 402 would provide a low-resistance path that prevents the development of voltage across resistor 414.

Figure 5:
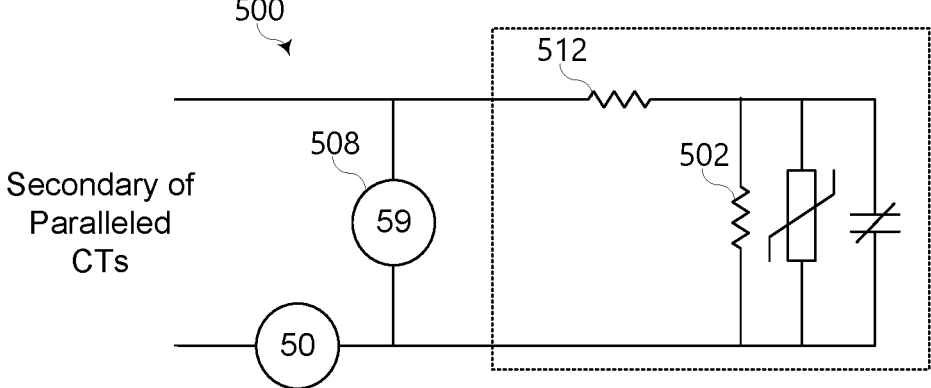
FIG. 5 illustrates a simplified block diagram of a high-impedance protection module that includes a series resistor in a high impedance module consistent with embodiments of the present disclosure.

FIG. 5 illustrates a high-impedance differential protection circuit 500 that includes a series resistor 512 in a high impedance module and consistent with embodiments of the present disclosure. The addition of series resistor 512 does not affect the performance of the module for external faults. Similarly, series resistor 512 does not affect the behavior of high-impedance differential protection circuit 500 for internal faults when the resistance of series resistor 512 is much less than a stabilizing resistor 502.

Figure 6:
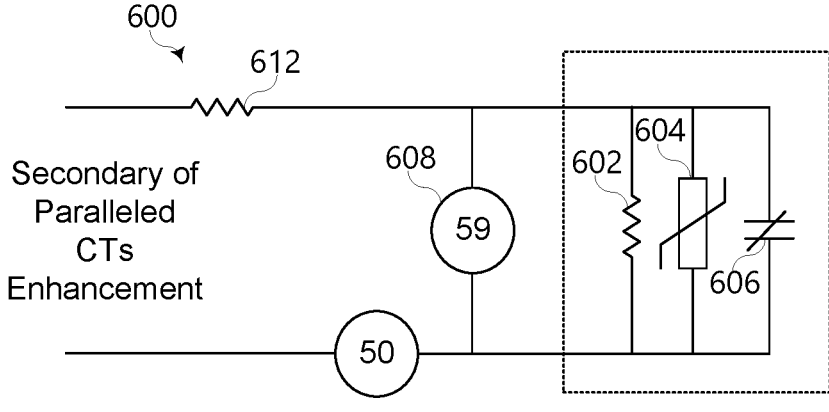
FIG. 6 illustrates a simplified block diagram of a high-impedance protection module that includes a series resistor located outside of a high-impedance module consistent with embodiments of the present disclosure.

FIG. 6 illustrates a high-impedance differential protection circuit 600 that includes a series resistor 612 located outside of a high-impedance module consistent with embodiments of the present disclosure. If series resistor 612 is connected outside of the high impedance module, as illustrated in FIG. 6 (e.g. in the leads between the CT connections and the module) overvoltage element 608 will see a smaller voltage for internal faults, yet the reduction can be compensated as the ratio of a stabilizing resistor 602 to series resistance 612 or the ratio of stabilizing resistor 602 and the resistance of stabilizing resistor 602 and the resistance of varistor 604.

After detecting a fault, a signal may be generated to trigger bypass relay to close and avoid overloading the MOVs and stabilizing resistor 602. Then the secondary fault current flows via the low-resistance path created by bypass relay 606. In many cases these impedances have a large inductive component leading to a secondary inductive system which, when closing the bypass relay 606 may generate a fully offset secondary current leading to twice as much peak current, increasing mechanical stress and the likelihood of bypass shorting or other damage. A properly sized bypass will withstand this current, but it will cost more than smaller, less capable bypass relays. Various embodiments may time the closing of the bypass relay 606 to minimize the DC offset in the secondary circuit. In other embodiments, the signal to close bypass relay 606 may be generated without delay which may cause larger DC offset in the secondary system.

Figure 7:
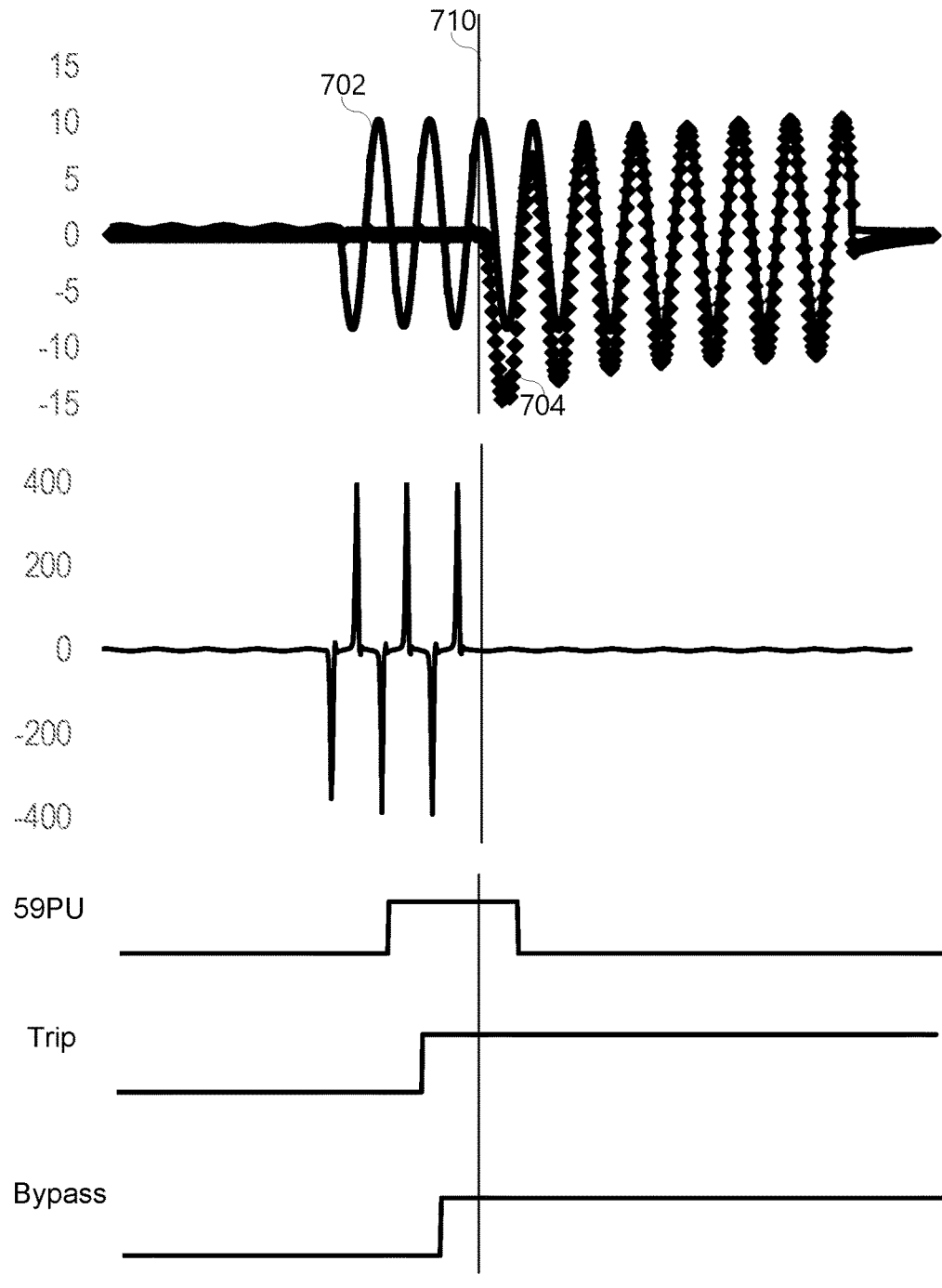
FIG. 7 illustrates a plot of electrical measurements during closing of the bypass relay consistent with embodiments of the present disclosure.

FIG. 7 illustrates a plot of the response of a high-impedance differential protection circuit that includes a DC offset in the secondary circuit consistent with embodiments of the present disclosure. A fault current 702 and current measurement 704 are plotted. Typically, a bypass relay is simply closed without regard to condition in the circuit. This can lead to a DC offset. As illustrated, the DC offset causes current measurement 704 to swing substantially during the first several cycles.

Figure 8:
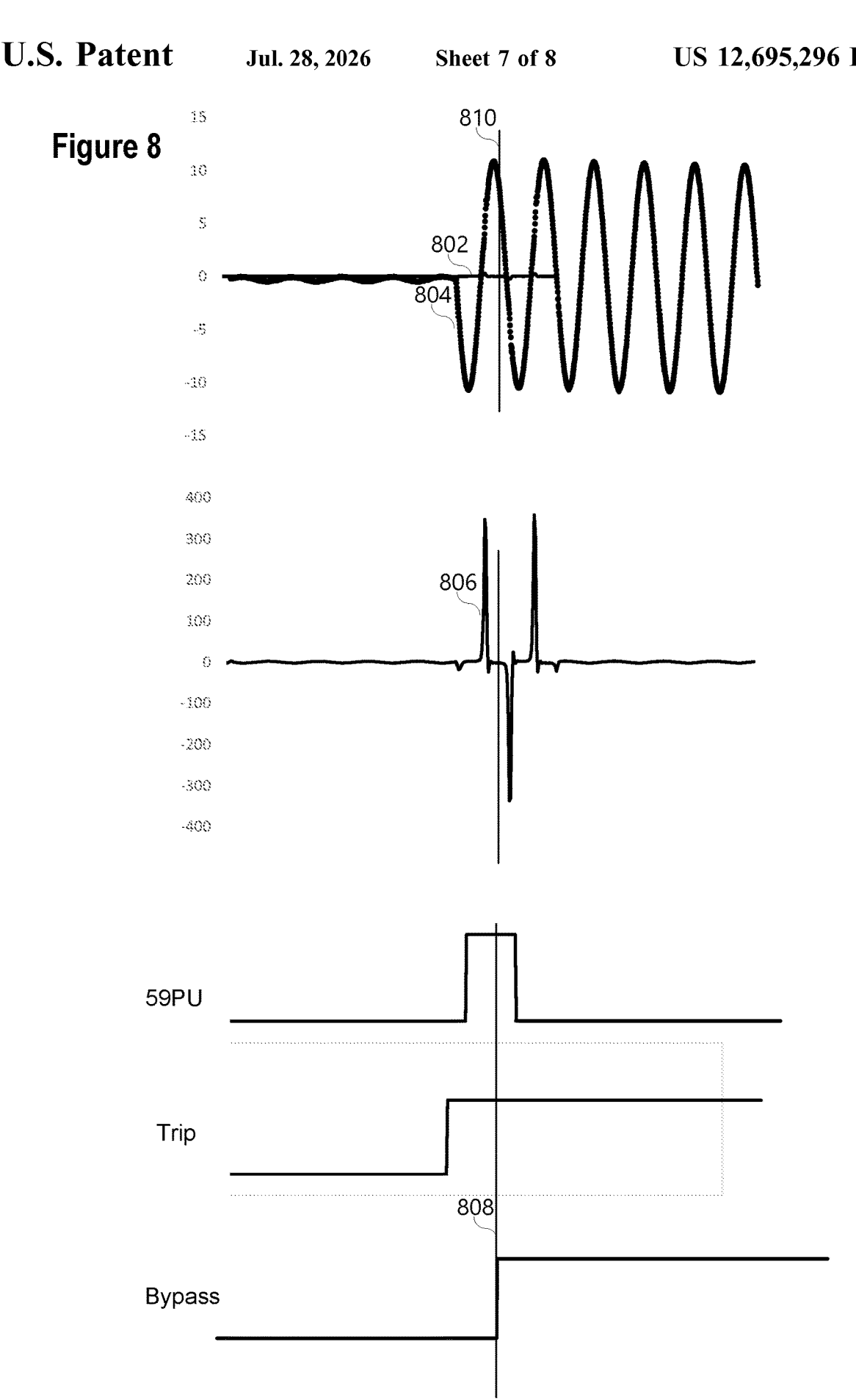
FIG. 8 illustrates a plot of electrical measurements during closing of the bypass relay to minimize DC offset consistent with embodiments of the present disclosure.

FIG. 8 illustrates a plot of the response of a high-impedance differential protection circuit that times the closing of a bypass relay to reduce a DC offset in the secondary circuit consistent with embodiments of the present disclosure. In this case synchronization of the closing of the bypass relay is implemented by changing a 59-element trip delay. In one specific embodiment, a protective device tracks spikes in a voltage signal 806. The system may close a bypass relay at 808 as the next spike begins. In various embodiments, this may be achieved using 1 ms update output contacts that are also used for arc flash protection. Fast hybrid outputs may also be used.

Figure 9:
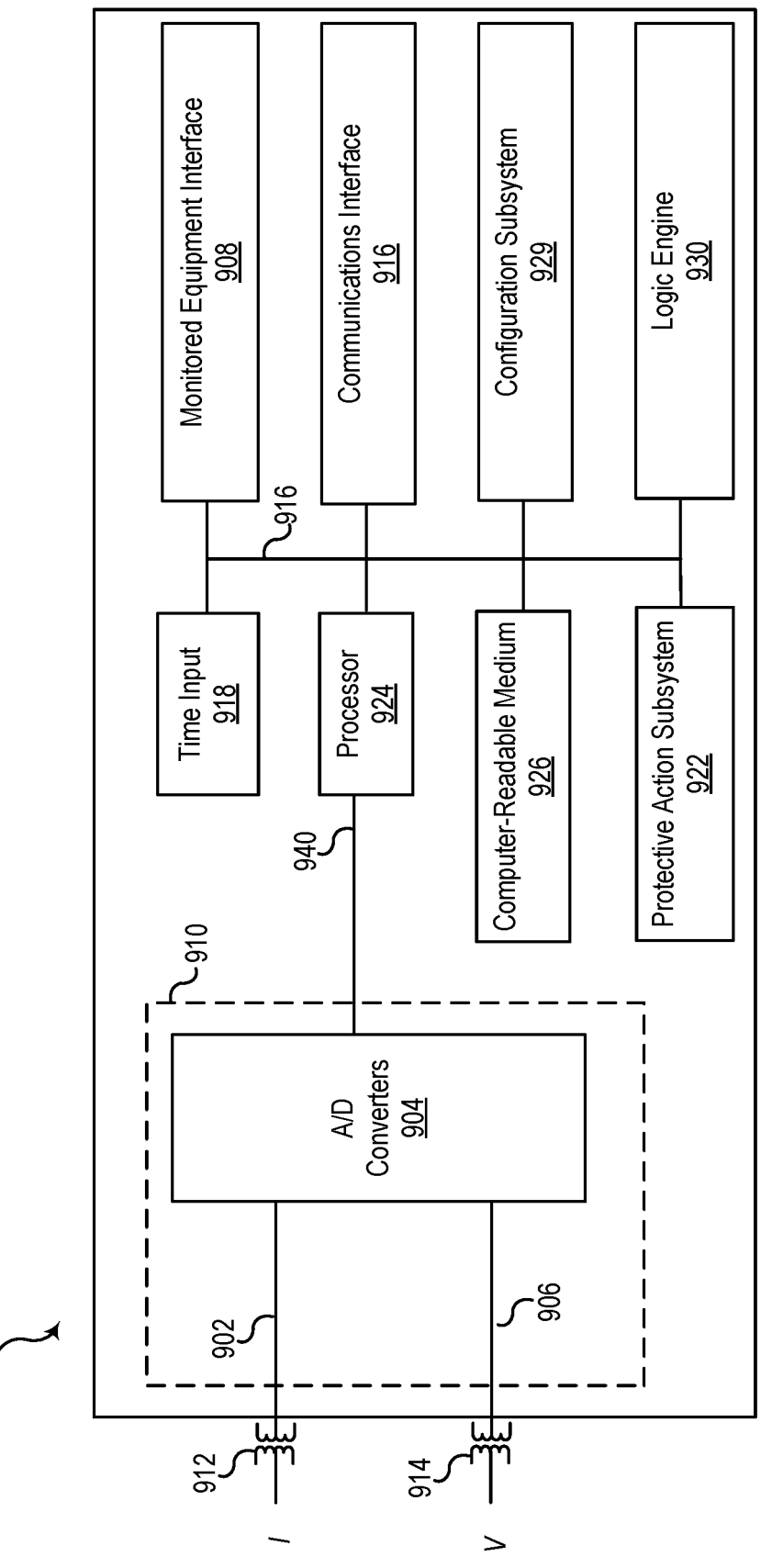
FIG. 9 illustrates a simplified block diagram of a protective device for use in an electric power system consistent with embodiments of the present disclosure.

FIG. 9 illustrates a simplified block diagram of a protective device 900 for use in an electric power system consistent with embodiments of the present disclosure. Protective device 900 may be implemented using hardware, software, firmware, and/or any combination thereof. In some embodiments, protective device 900 may be embodied as an IED, a protective relay, or other type of device. Certain components or functions described herein may be associated with other devices or performed by other devices. The specifically illustrated configuration is merely representative of one embodiment consistent with the present disclosure.

System 900 includes a communications interface 916 to communicate with relays, IEDs, and/or other devices. In certain embodiments, the communications interface 916 may facilitate direct communication or communicate with systems over a communications network (not shown). System 900 may further include a time input 918, which may be used to receive a time signal (e.g., a common time reference) allowing system 900 to apply a time stamp to acquired samples. In certain embodiments, a common time reference may be received via communications interface 916, and accordingly, a separate time input may not be required for time-stamping and/or synchronization operations. One such embodiment may employ the IEEE 1588 protocol. A monitored equipment interface 908 may receive status information from, and issue control instructions or protective actions to monitored equipment (e.g., a circuit breaker, conductor, transformer, or the like).

Processor 924 processes communications received via communications interface 916, time input 918, and/or monitored equipment interface 908. Processor 924 may operate using any number of processing rates and architectures. Processor 924 may perform various algorithms and calculations described herein. Processor 924 may be embodied as a general-purpose integrated circuit, an application-specific integrated circuit, a field-programmable gate array, and/or any other suitable programmable logic device. A data bus 916 may provide connection between various components of system 900. A configuration subsystem 929 may allow an operator to configure various aspects of system 900, including criteria related to thresholds or parameters described above.

Instructions to be executed by processor 924 may be stored in computer-readable medium 926. Computer-readable medium 926 may comprise random access memory (RAM) and non-transitory memory. Computer-readable medium 926 may be the repository of software modules configured to implement the functionality described herein.

System 900 may include a sensor component 910. In the illustrated embodiment, sensor component 910 may receive current measurements 902 and/or voltage measurements 906. The sensor component 910 may comprise A/D converters 904 that sample and/or digitize filtered waveforms to form corresponding digitized current and voltage signals. Current measurements 902 and/or voltage measurements 906 may pass through transformers 912 and 914, respectively. Transformers 912 and 914 may generate raw signals representative of electrical conditions in an electric power system. In some embodiments, the signals may be a summation of three phases in an electric power system. Alternatively, additional inputs may be provided for each phase of a three-phase electric power system. A/D converters 904 may be connected to processor 924 by way of data bus 940, through which digitized representations of current and voltage signals may be transmitted. Current measurements 902 may be used to provide overcurrent protection. Similarly, voltage measurements 906 may be used to provide overvoltage protection.

Protective action subsystem 922 may implement a protective action based on detection of a fault condition or other anomalous condition. Protective actions may include actuating a breaker to interrupt the flow of electrical current through a portion of the electric power system 900. Protective actions may be implemented directly by system 900 or may be communicated to other devices to be implemented. Protective actions may be triggered when current measurements 902 and/or voltage measurements 906 exceed a threshold.

A logic engine 930 may perform the comparisons and logical operations described herein. For example, logic engine 930 may compare current measurements 902 to a threshold to determine if the signal exceeds the threshold. Similarly, logic engine 930 may compare voltage measurements 906 to a threshold to determine if the signal exceeds the threshold. If the voltage or current signals exceed an applicable threshold, system 900 may trigger a protective action.

What is claimed:

1. A protective device configured for use in an electric power system, comprising:
   an overvoltage element configured to monitor a voltage and to initiate a protective action when the voltage exceeds a first threshold;
   a variable resistor disposed in parallel with the overvoltage element and to generate substantially all of an electrical resistance across the overvoltage element when the voltage is less than the first threshold; and
   a bypass device disposed in parallel with the overvoltage element and the variable resistor and configured to transition from a first state to a second state in response to a signal generated by the protective device;
   wherein the signal to transition the bypass device from the first state to the second state is generated a length of time after the voltage exceeds the first threshold, and after the bypass device provides a low-resistance path to dissipate the voltage across the overvoltage element and the variable resistor in the second state, and
   wherein the signal to transition the bypass device from the first state to the second state is generated when a DC offset is minimized.

2. The protective device of claim 1, wherein the length of time is based on a spike in the voltage.

3. The protective device of claim 1, wherein the variable resistor comprises a metal oxide varistor.

4. The protective device of claim 1, wherein the protective device lacks a stabilizing resistor disposed in parallel with the overvoltage element.

5. The protective device of claim 4, further comprising a series resistor disposed in series between a plurality of current transformers in electrical communication with protected equipment in the electric power system and the overvoltage element, the variable resistor, and the bypass device.

6. The protective device of claim 1, further comprising an overcurrent protective element configured to monitor a current and to initiate a second protective action when the current exceeds a second threshold.

7. The protective device of claim 6, wherein the overcurrent protective element is further configured to receive signals generated by a plurality of current transformers in electrical communication with protected equipment in the electric power system, each of the plurality of current transformers comprising a secondary winding that includes two terminals connected in parallel to form a pair of current transformer secondaries.

8. The protective device of claim 1, wherein the protective device further comprises a high-impedance module.

9. The protective device of claim 1, wherein the length of time is approximately zero.

10. A method of operating a protective device in an electric power system, the method comprising:

monitoring, using an overvoltage element, a voltage and initiating a protective action when the voltage exceeds a first threshold;

generating, using a variable resistor disposed in parallel with the overvoltage element, substantially all of an electrical resistance across the overvoltage element when the voltage is less than the first threshold;

transitioning a bypass device disposed in parallel with the overvoltage element and the variable resistor from a first state to a second state in response to a signal generated by the protective device; and generating the signal to transition the bypass device from the first state to the second state when a DC offset is minimized;

wherein the signal to transition the bypass device from the first state to the second state is generated a length of time after the voltage exceeds the first threshold, and after the bypass device provides a low-resistance path to dissipate the voltage across the overvoltage element and the variable resistor in the second state.

11. The method of claim 10, wherein the length of time is based on a spike in the voltage.

12. The method of claim 10, wherein the variable resistor comprises a metal oxide varistor.

13. The method of claim 10, wherein the protective device lacks a stabilizing resistor disposed in parallel with the overvoltage element.

14. The method of claim 13, further comprising providing a series resistor disposed in series between a plurality of current transformers in electrical communication with protected equipment in the electric power system and the overvoltage element, the variable resistor, and the bypass device.

15. The method of claim 10, further comprising monitoring, using an overcurrent protective element, a current and initiating a protective action when the current exceeds a first threshold.

16. The method of claim 15, further comprising receiving, using the overcurrent protective element, signals generated by a plurality of current transformers in electrical communication with protected equipment in the electric power system, each of the plurality of current transformers comprising a secondary winding that includes two terminals connected in parallel to form a pair of current transformer secondaries.

17. The method of claim 16, wherein the protective device further comprises a high-impedance module.

18. A protective device configured for use in an electric power system, comprising:

an overvoltage element configured to monitor a voltage and to initiate a protective action when the voltage exceeds a first threshold;

a variable resistor disposed in parallel with the overvoltage element and to generate substantially all of an electrical resistance across the overvoltage element when the voltage is less than the first threshold; and a bypass device disposed in parallel with the overvoltage element and the variable resistor and configured to transition from a first state to a second state in response to a signal;

a plurality of current transformers in electrical communication with protected equipment in the electric power system and the overvoltage element;

a series resistor disposed in series between the plurality of current transformers and the overvoltage element, the variable resistor, and the bypass device;

wherein the signal to transition the bypass device from the first state to the second state is generated when the voltage exceeds the first threshold.

* * * * *